US012646698B2

(12) United States Patent
Takahashi

(10) Patent No.: US 12,646,698 B2
(45) Date of Patent: Jun. 2, 2026

(54) MASS SPECTROMETER AND MASS SPECTROMETRY METHOD

(71) Applicant: SHIMADZU CORPORATION, Kyoto (JP)

(72) Inventor: Hidenori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 306 days.

(21) Appl. No.: 18/283,605

(22) PCT Filed: Dec. 23, 2021

(86) PCT No.: PCT/JP2021/047972
§ 371 (c)(1),
(2) Date: Sep. 22, 2023

(87) PCT Pub. No.: WO2022/201705
PCT Pub. Date: Sep. 29, 2022

(65) Prior Publication Data
US 2024/0177980 A1 May 30, 2024

(30) Foreign Application Priority Data
Mar. 23, 2021 (JP) ................................ 2021-048325

(51) Int. Cl.
*H01J 49/00* (2006.01)

(52) U.S. Cl.
CPC ................................ *H01J 49/0045* (2013.01)

(58) Field of Classification Search
USPC ................................................ 250/282, 281
See application file for complete search history.

(56) References Cited

U.S. PATENT DOCUMENTS

2014/0330524 A1* 11/2014 Geromanos ........ G01N 30/7206 702/19
2016/0372311 A1 12/2016 Takahashi et al.
(Continued)

FOREIGN PATENT DOCUMENTS

JP 2012-514337 A 6/2012
JP 2020-177784 A 10/2020
(Continued)

OTHER PUBLICATIONS

Hidenori Takahashi et al., "Identifying Double Bond Positions in Phospholipids Using Liquid Chromatography-Triple Quadrupole Tandem Mass Spectrometry Based on Oxygen Attachment Dissociation", Mass Spectrometry, 2019, pp. 1-6, vol. 8, Issue 2, pp. S0080.
(Continued)

*Primary Examiner* — Kiet T Nguyen
(74) *Attorney, Agent, or Firm* — Sughrue Mion, PLLC

(57) ABSTRACT

The precursor ion is reacted with ammonia molecules or ammonia radicals to generate product ions, the product ions are separated according to a mass-to-charge ratio, and detected. It is estimated that whether or not an aldehyde group is included in a molecular structure of the precursor ion based on a difference between a mass-to-charge ratio of one of the detected product ion and a mass-to-charge ratio of the precursor ion. In addition, provided is a mass spectrometer (1) including: a reaction chamber (132) to which the precursor ions are introduced; an ammonia supply part (5) configured to supply ammonia molecules or ammonia radicals to the reaction chamber; and separation and detection parts (142, 143, 144, and 145) configured to separate product ions generated from the precursor ion by reaction with the ammonia molecules or ammonia radicals according to a mass-to-charge ratio, and to detect the product ions.

6 Claims, 4 Drawing Sheets

(56) References Cited

U.S. PATENT DOCUMENTS

| | | | |
|---|---|---|---|
| 2020/0111654 | A1 | 4/2020 | Takahashi et al. |
| 2021/0050198 | A1 | 2/2021 | Takahashi |
| 2022/0230861 | A1 | 7/2022 | Takahashi |

FOREIGN PATENT DOCUMENTS

| | | | |
|---|---|---|---|
| WO | 2010/078160 | A2 | 7/2010 |
| WO | 2015/133259 | A1 | 9/2015 |
| WO | 2018/186286 | A1 | 10/2018 |
| WO | 2019/155725 | A1 | 8/2019 |
| WO | 2019/202518 | A1 | 10/2019 |
| WO | 2020/240908 | A1 | 12/2020 |

OTHER PUBLICATIONS

Sebastian Wolf et al., "In silico fragmentation for computer assisted identification of metabolite mass spectra", 2010, pp. 1-12, BMC Bioinformatics, 11, 148.

Bartomiej Witkowski et al., Analysis of α-acyloxyhydroperoxy aldehydes with electrospray ionization-tandem mass spectrometry (ESI-MSn), Journal Mass Spectrometry, 2013, pp. 79-88, vol. 48/Iss. 1, Abstract, Figure 3.

Written Opinion for PCT/JP2021/047972, dated Mar. 8, 2022.

International Search Report for PCT/JP2021/047972, dated Mar. 8, 2022.

First Office Action dated May 14, 2024 issued for the corresponding Japanese Patent Application No. 2023-508637.

Extended European Search Report dated Aug. 16, 2024 issued for the corresponding European Patent Application No. 21933295.4.

Castleman et al., "Metallic Ions and Clusters: Formation, Energetics, and Reaction", Z. Phys. D—Atoms Molecules and Clusters, vol. 3, Jun. 1, 1986, pp. 167-176.

Van Helden et al., "Production Mechanisms of NH and $NH_2$ Radicals in $N_2$—$H_2$ Plasmas", The Journal of Physical Chemistry A, vol. 111, No. 45, Oct. 12, 2007, pp. 11460-11472.

Zhou et al, "Sustainable ammonia production by non-thermal plasmas: Status, mechanisms, and opportunities", Chemical Engineering Journal, vol. 421, Mar. 31, 2021, pp. 1-13.

Office Action issued Oct. 29, 2024 in Japanese Application No. 2023-508637.

Communication dated Mar. 26, 2026, issued in Chinese Application No. 202180095966.6.

* cited by examiner

PRECURSOR ION: m/z = 157.1591

ADDUCT ION: m/z = 174.1854

MASS SPECTROMETER AND MASS SPECTROMETRY METHOD

CROSS REFERENCE TO RELATED APPLICATIONS

This application is a National Stage of International Application No. PCT/JP2021/047972 filed Dec. 23, 2021, claiming priority based on Japanese Patent Application No. 2021-048325 filed Mar. 23, 2021.

TECHNICAL FIELD

The present invention relates to a mass spectrometer and a mass spectrometry method.

BACKGROUND ART

In order to identify a polymer compound in a sample or analyze its structure, the mass spectrometry method is widely used to select ions having a specific mass-to-charge ratio as precursor ions from ions derived from sample components, dissociating the precursor ions to generate various productions, and separate and detect the product ions according to the mass-to-charge ratio. As such a mass spectrometry method, a collision induced dissociation (CID) method is most common. In the collision induced dissociation method, precursor ions accelerated by imparting energy (collision energy) are repeatedly collided with an inert gas (collision gas) such as argon to accumulate energy in the precursor ions and dissociate the precursor ions.

Many of polymer compounds are organic substances having a hydrocarbon chain as a main skeleton. In order to know the characteristics of such a polymer compound, it is effective to obtain information such as the presence or absence of an unsaturated bond between carbon atoms and the presence or absence of a characteristic functional group.

However, in the energy accumulation type ion dissociation method such as the collision induced dissociation method, the energy accumulated in the precursor ions is dispersed in the entire molecule, and thus the selectivity of the position where the precursor ions are dissociated is low, and it is difficult to dissociate the precursor ions at the positions of unsaturated bonds of carbon atoms or specific functional groups. In addition, the mode in which the precursor ions are dissociated varies depending on measurement conditions such as the magnitude of the collision energy and the gas pressure of the collision gas. Therefore, it is difficult to obtain information on unsaturated bonds of carbon atoms or specific functional groups by the collision induced dissociation method.

Therefore, recently, a radical attachment dissociation method has been proposed in which radicals are attached to precursor ions derived from a sample component to dissociate the precursor ions at the position of unsaturated bonds between carbon atoms or specific functional groups. For example, Patent Literatures 1 and 2 disclose that hydrogen radicals or the like are attached to precursor ions to selectively dissociate the precursor ions at the position of peptide bonds. In addition, Patent Literatures 3 and 4 disclose that oxygen radicals or the like are attached to precursor ions to selectively dissociate the precursor ions at the position of unsaturated bonds included in hydrocarbon chains.

CITATION LIST

Patent Literature

Patent Literature 1: WO 2015/133259 A
Patent Literature 2: WO 2018/186286 A
Patent Literature 3: WO 2019/155725 A
Patent Literature 4: WO 2020/240908 A
Patent Literature 5: JP 2020-177784 A

Non Patent Literature

Non Patent Literature 1: Hidenori Takahashi, Yuji Shimabukuro, Daiki Asakawa, Akihito Korenaga, Masaki Yamada, Shinichi Iwamoto, Motoi Wada, Koichi Tanaka, "Identifying Double Bond Positions in Phospholipids Using Liquid Chromatography-Triple Quadrupole Tandem Mass Spectrometry Based on Oxygen Attachment Dissociation", Mass Spedctrometry, Volume 8, Issue 2, Pages S0080, 2019

Non Patent Literature 2: Wolf, S., Schmidt, S., Muller-Hannemann, M., & Neumann, S., "In silico fragmentation for computer assisted identification of metabolite mass spectra", BMC Bioinformatics, 11, 148, 2010

SUMMARY OF INVENTION

Technical Problem

As described above, it has been proposed to selectively dissociate precursor ions at a specific site using a radical attachment dissociation method, but an effective method for an aldehyde group, which is one of representative functional groups in an organic compound, has not yet been proposed, and a technique for acquiring information on the aldehyde group is also required.

An object of the present invention is to provide a technique capable of acquiring information on carbon-oxygen double bonds included in a molecular structure of a sample component.

Solution to Problem

A mass spectrometry method according to the present invention made to solve the above problems includes:

reacting a precursor ion with ammonia molecules or ammonia radicals to generate product ions;

separating the product ions according to a mass-to-charge ratio and detecting the product ions; and estimating whether or not an aldehyde group is included in a molecular structure of the precursor ion based on the difference between a mass-to-charge ratio of one of the detected product ions and a mass-to-charge ratio of the precursor ion.

Another mode of the present invention made to solve the above problems is an apparatus for generating product ions from a precursor ion and performing mass spectrometry, the apparatus including:

a reaction chamber to which the precursor ion is introduced;

an ammonia supply part configured to supply ammonia molecules or ammonia radicals to the reaction chamber; and a separation and detection part configured to separate product ions generated from the precursor ion by reaction with the ammonia molecules or ammonia radicals according to a mass-to-charge ratio, and to detect the product ions.

Advantageous Effects of Invention

In the present invention, a precursor ion derived from a sample component is reacted with ammonia molecules ($NH_3$) or ammonia radicals (NH radicals or $NH_2$ radicals) to generate product ions, and the generated product ions are separated according to a mass-to-charge ratio, and detected. Then, whether or not an aldehyde group is included in the molecular structure of the precursor ion is estimated based on the difference between the mass-to-charge ratio of one of the product ions and the mass-to-charge ratio of the precursor ion. The presence or absence of the aldehyde group may be estimated personally by an analyst or automatically by the mass-analyzing apparatus. The present invention is based on the finding that when a precursor ion having an aldehyde group is reacted with an ammonia molecule or an ammonia radical, they selectively act on the aldehyde group to change a double bond of a carbon atom-oxygen atom to a single bond, and an adduct ion in which a hydrogen atom is bonded to the carbon atom side and an amino group is bonded to the oxygen atom side is generated. When a precursor ion having an aldehyde group is reacted with an ammonia molecule or an ammonia radical, a product ion (an adduction) with a mass increased by 17 Da per one aldehyde group is generated. Therefore, whether or not an aldehyde group is included in the molecular structure of the precursor ion can be estimated based on the difference between the mass-to-charge ratio of one of the product ions generated from the precursor ion and the mass-to-charge ratio of the precursor ion.

DESCRIPTION OF EMBODIMENTS

Hereinafter, an embodiment of a mass spectrometer and a mass spectrometry method according to the present invention will be described with reference to the drawings.

Figure 1:
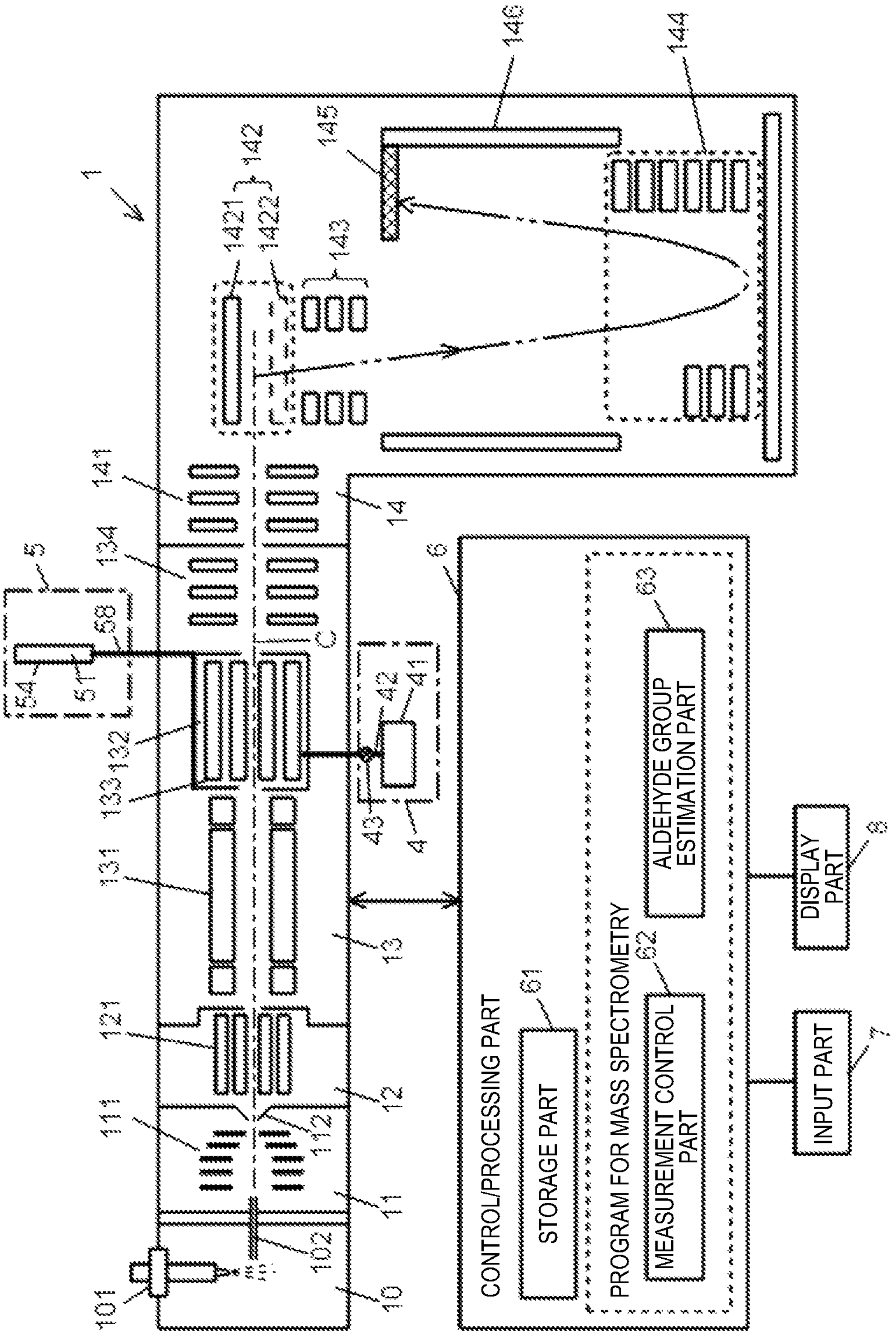
FIG. 1 is a configuration diagram of a main part of an embodiment of a mass spectrometer according to the present invention.

FIG. 1 illustrates a schematic configuration of a mass spectrometer 1 of the present embodiment. The mass spectrometer 1 generally includes a mass spectrometer main body and a control/processing part 6.

The mass spectrometer main body includes an ionization chamber 10 under a substantially atmospheric pressure and a vacuum chamber. The vacuum chamber includes a first intermediate vacuum chamber 11, a second intermediate vacuum chamber 12, a third intermediate vacuum chamber 13, and an analysis chamber 14 in this order from a side of the ionization chamber 10, and has a configuration of a multi-stage differential exhaust system with increasing degree of vacuum in this order.

The ionization chamber 10 is provided with an electrospray ionization probe (ESI probe) 101 for nebulizing a liquid sample while imparting electric charges to the liquid sample. The liquid sample may be directly supplied into the ESI probe 101, or a sample component separated from other components contained in the liquid sample by a column of a liquid chromatograph may be introduced.

The ionization chamber 10 and the first intermediate vacuum chamber 11 communicate with each other through a small-diameter heated capillary 102. In the first intermediate vacuum chamber 11, an ion lens 111 is disposed that includes a plurality of ring-shaped electrodes having different diameters and focuses ions in the vicinity of an ion optical axis C that is a central axis of a flight path of ions.

The first intermediate vacuum chamber 11 and the second intermediate vacuum chamber 12 are separated from each other by a skimmer 112 having a small hole at its top. In the second intermediate vacuum chamber 12, an ion guide 121 is disposed that includes a plurality of rod electrodes disposed so as to surround the ion optical axis C and focuses ions in the vicinity of the ion optical axis C.

In the third intermediate vacuum chamber 13, there are disposed: a quadrupole mass filter 131 to separate ions according to their mass-to-charge ratio; a collision cell 132 including a multipole ion guide 133 inside; and an ion guide 134 to transport ions discharged from the collision cell 132. The ion guide 134 includes a plurality of ring-shaped electrodes having a same diameter.

A collision gas supply part 4 is connected to the collision cell 132. The collision gas supply part 4 includes: a collision gas source 41; a gas introduction flow path 42 for introducing gas from the collision gas source 41 into the collision cell 132; and a valve 43 for opening and closing the gas introduction flow path 42. As the collision gas, for example, an inert gas such as a nitrogen gas or an argon gas is used.

Figure 2:
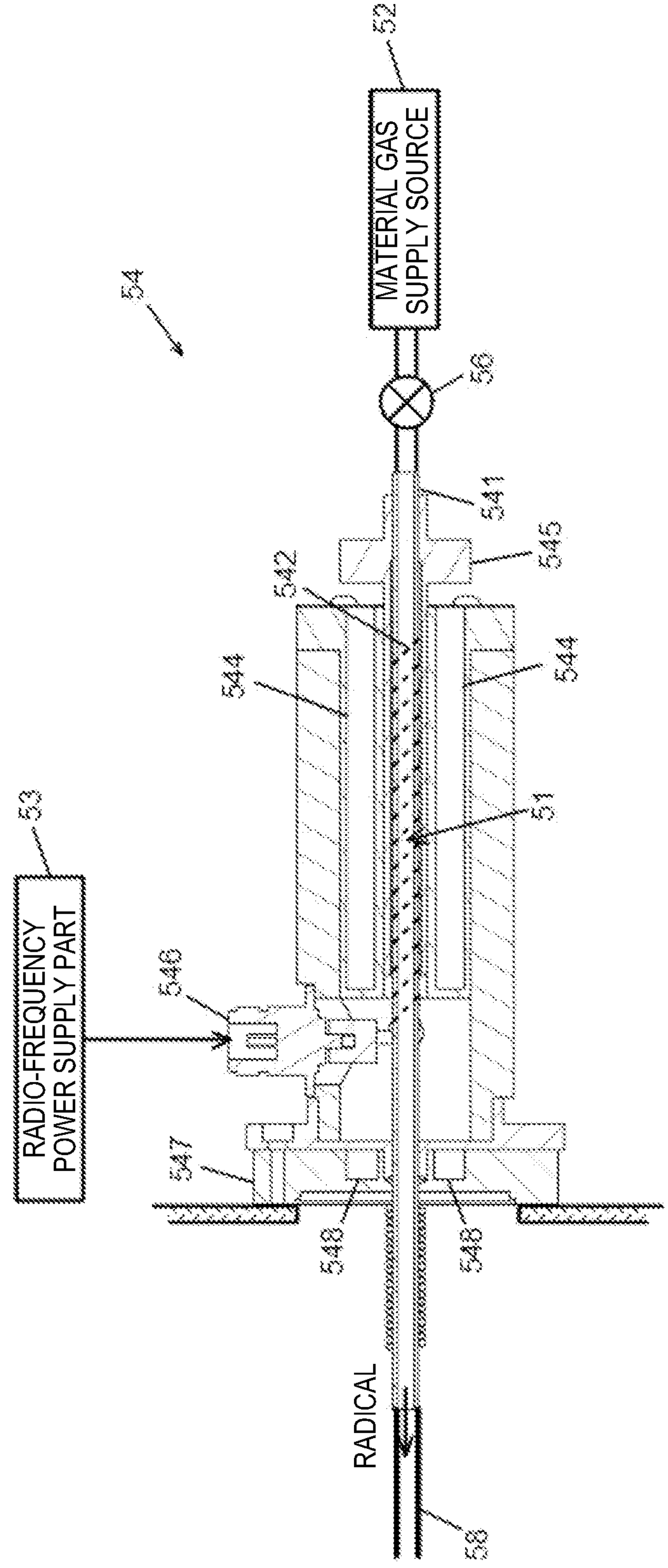
FIG. 2 is a schematic configuration diagram of a radical generation part in the mass spectrometer of the present embodiment.

In addition, a radical supply part 5 is also connected to the collision cell 132. The radical supply part 5 has a configuration similar to that described in Patent Literature 5 and Non Patent Literature 1. As illustrated in FIGS. 1 and 2, the radical supply part 5 includes a radical source 54 in which a radical generation chamber 51 is formed, a vacuum pump (not illustrated) that exhausts the radical generation chamber 51, a material gas supply source 52 that supplies gas (material gas) as a material of radicals, and a radio-frequency power supply part 53. A valve 56 for adjusting a flow rate of the material gas is provided in a flow path from the material gas supply source 52 to the radical generation chamber 51.

FIG. 2 illustrates a cross-sectional view of the radical source 54. The radical source 54 has a tubular body 541 made of a dielectric such as alumina (for example, aluminum oxide, quartz, or aluminum nitride), and its internal space serves as the radical generation chamber 51. A plunger 545 fixes the tubular body 541 in a state in which the tubular body 541 is inserted into a hollow cylindrical magnet 544. A spiral antenna 542 (broken line in FIG. 2) is wound around the outer periphery of a portion located inside the magnet 544 of the tubular body 541.

In addition, the radical source 54 is provided with a radio-frequency power input part 546. The radio-frequency power supply part 53 supplies radio-frequency power to the radio-frequency power input part 546. The radical source 54 further includes a flange 547 for fixing a tip portion of the radical source 54. The flange 547 accommodates a hollow cylindrical magnet 548 having a same diameter as the magnet 544 and forming a pair with the magnet 544. The magnets 544 and 548 generate a magnetic field inside the tubular body 541 (radical generation chamber 51) to easily generate and maintain plasma by the action.

As the material gas, a gas capable of generating ammonia radicals (NH radicals or $NH_2$ radicals) is used. As such a material gas, for example, a mixed gas of nitrogen gas and water vapor can be used. In this case, nitrogen radicals are generated from nitrogen gas and hydrogen radicals are generated from water vapor, and these radicals are bonded to each other to generate ammonia radicals. In addition, it is also possible to directly generate amino radicals using ammonia gas. Alternatively, various gases (including mixed gas) can be used such as generation of nitrogen radicals using air as a material gas and generation of hydrogen radicals using hydrogen gas as a material gas.

A transport pipe 58 for transporting the radicals generated in the radical generation chamber 51 to the collision cell 132 is connected to an outlet end of the radical source 54. The transport pipe 58 is an insulating pipe, and for example, a quartz glass pipe or a borosilicate glass pipe can be used.

Figure 3:
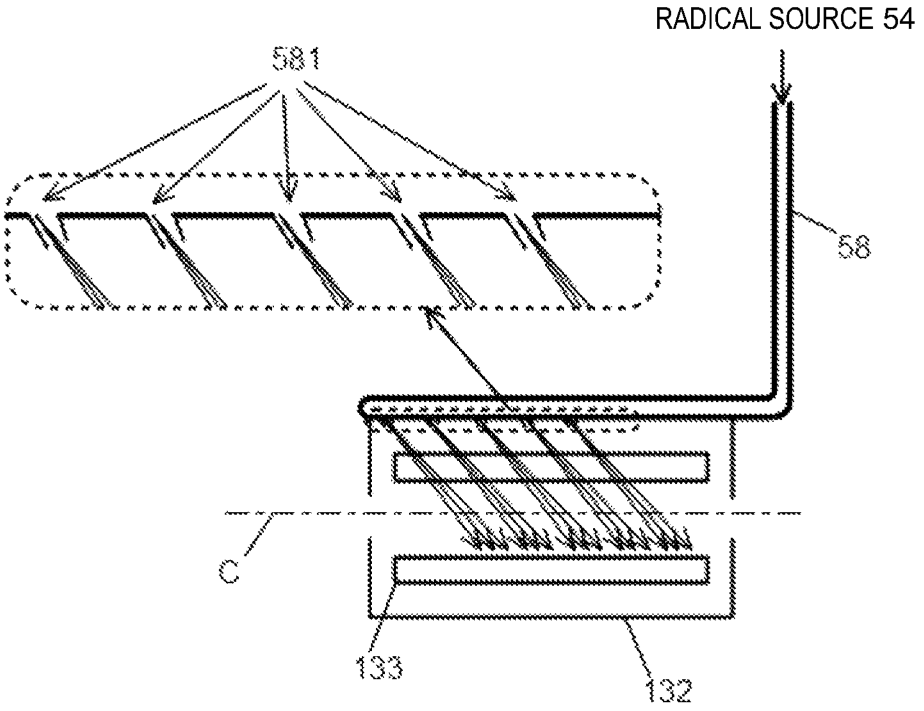
FIG. 3 is a schematic configuration diagram of a radical transport path in the mass spectrometer of the present embodiment.

As illustrated in FIG. 3, in the transport pipe 58, a plurality of head parts 581 are provided in a portion disposed along a wall surface of the collision cell 132. Each head part 581 is provided with an inclined cone-shaped introduction port, and radicals are introduced in a direction intersecting the central axis (ion optical axis C) of a flight direction of ions. As a result, the radicals are uniformly supplied to the inside of the collision cell 132.

The mass spectrometer 1 of the present embodiment includes the radical supply part 5 as an ammonia supply part, and supplies ammonia radicals from the radical supply part 5 to the inside of the collision cell 132. However, ammonia molecules may be supplied to the inside of the collision cell 132 instead of ammonia radicals. In this case, a material gas supply source 52 may be used as the ammonia supply part, and the material gas supply source 52 may be directly connected to the collision cell 132. As the material gas for generating ammonia molecules, for example, ammonia gas or vapor of ammonia water can be used.

The analysis chamber 14 includes: an ion transport electrode 141 for transporting the incident ions from the third intermediate vacuum chamber 13 to the orthogonal acceleration part; an orthogonal acceleration electrode 142 including a pair of an expulsion electrode 1421 and a lead-in electrode 1422 disposed in such a manner as to face each other across the incident optical axis of the ions (an orthogonal acceleration area); an acceleration electrode 143 for accelerating the ions ejected to a flight space by the orthogonal acceleration electrode 142; a reflectron electrode 144 for forming a return path for the ions within the flight space; an ion detector 145; and a flight tube 146 configured to define a periphery of the flight space.

The control/processing part 6 controls operations of each part and has a function of storing and analyzing data obtained by the ion detector 145. The control/processing part 6 includes a measurement control part 62 and an aldehyde group estimation part 63 as functional blocks in addition to a storage part 61. The storage part 61 stores a method file describing measurement conditions when measurement to be described later is performed, and information for converting a time of flight of an ion into a mass-to-charge ratio of the ion. The entity of the control/processing part 6 is a general personal computer to which an input part 7 and a display part 8 are connected, and embodies the functional blocks described above by a processor executing a mass analysis program installed in advance.

Then, as an example of the mass spectrometry method according to the present invention, an analysis procedure using the mass spectrometer 1 of the present embodiment will be described. Processing related to a series of measurements described below is executed by the measurement control part 62 controlling each part of the mass spectrometer. In this example, first, MS measurement for determining the mass-to-charge ratio of precursor ions is performed, then ammonia radicals are attached to the precursor ions to generate product ions, and MS/MS measurement for measuring the mass-to-charge ratio is performed.

When a user gives an instruction to start the analysis by a predetermined input operation, the liquid sample is introduced from an injector (not illustrated) in which the liquid sample is set in advance into the electrospray ionization probe 101 and ionized.

The ions generated from the sample are drawn into the first intermediate vacuum chamber 11 through the heated capillary 102 by a pressure difference between the ionization chamber 10 and the first intermediate vacuum chamber 11. In the first intermediate vacuum chamber 11, the ion lens 111 focuses the ions in the vicinity of the ion optical axis C.

The ions focused in the first intermediate vacuum chamber 11 subsequently enter the second intermediate vacuum chamber 12, are again focused in the vicinity of the ion optical axis C by the ion guide 121, and then enter the third intermediate vacuum chamber 13.

In the MS measurement, all the ions are allowed to directly pass without operating the quadrupole mass filter 131 and the collision cell 132 in the third intermediate vacuum chamber 13. The ions having passed through the collision cell 132 are focused in the vicinity of the ion optical axis C by the ion guide 134, and then enter the analysis chamber 14.

The ion transport electrode 141 transports the ions having entered the analysis chamber 14 to the orthogonal acceleration electrode 142. A voltage is applied to the orthogonal acceleration electrode 142 at a predetermined period, and the traveling direction of the ions is deflected in a direction substantially orthogonal to the traveling direction so far. The ions with the deflected flight direction are accelerated by the acceleration electrode 143, and ejected to the flight space. The ions ejected to the flight space fly along a predetermined flight path defined by the reflectron electrode 144 and the flight tube 146 for a time corresponding to the mass-to-charge ratio of each ion, and are incident on the ion detector 145. The ion detector 145 outputs a signal having a magnitude corresponding to the incident amount of the ion every time the ion is incident. The output signals from the ion detector 145 are sequentially stored in the storage part 61. The storage part 61 stores measurement data with the time of flight of the ion and the detection intensity of the ion as axes.

When the measurement is completed, the measurement control part 62 reads the measurement data and the information for converting the time of flight of the ion into the mass-to-charge ratio of the ion stored in the storage part 61, and converts the read data into mass spectrum data with the mass-to-charge ratio of the ion and the detection intensity of the ion as axes.

The measurement control part 62 subsequently specifies a peak having the highest intensity in the mass spectrum data and acquires its mass-to-charge ratio. In the electrospray ionization probe 101 used in the present embodiment, protonated ions in which protons are added to sample molecules are usually generated the most. Hence, in the present embodiment, the protonated ion is specified as a precursor ion corresponding to the peak having the highest intensity.

After determining the mass-to-charge ratio of the precursor ion, the measurement control part 62 subsequently performs the MS/MS measurement. First, the inside of the radical generation chamber 51 is evacuated to a predetermined degree of vacuum by the vacuum pump, and the material gas (mixed gas of nitrogen gas and water vapor in the present embodiment) is introduced into the radical generation chamber 51 from the material gas supply source 52. Subsequently, the radio-frequency power supply part 53 supplies a radio-frequency voltage to the spiral antenna 542 to generate plasma in the radical generation chamber 51. As a result, nitrogen radicals and hydrogen radicals are generated from the material gas supplied to the radical generation chamber 51. These radicals are combined to become ammonia radicals inside the radical generation chamber 51 or while being transported from the radical generation chamber 51 to the collision cell 132.

As described above, in the present embodiment, ammonia radicals are generated and attached to the precursor ions, but ammonia molecules may be attached to the precursor ions instead of the ammonia radicals. In this case, ammonia molecules are supplied from the material gas supply source 52 to the inside of the collision cell 132, instead of the step relating to the generation of ammonia radicals.

After the radical supply part 5 generates radicals (or along with the generation of radicals), the liquid sample is introduced from the injector in which the liquid sample is set in advance into the electrospray ionization probe 101 and ionized.

As in the MS measurement, the ions generated from the sample are focused in the vicinity of the ion optical axis C while passing through the first intermediate vacuum chamber 11 and the second intermediate vacuum chamber 12, and enter the third intermediate vacuum chamber 13.

In the third intermediate vacuum chamber 13, the ions having the mass-to-charge ratio determined on the basis of the above MS measurement are selected as the precursor ions by the quadrupole mass filter 131 and introduced into the collision cell 132. As described above, the ammonia radicals are introduced into the collision cell 132, and the ammonia radicals are attached to the precursor ions. In this case, the ammonia radicals selectively are attached to positions of aldehyde groups included in the molecular structure of precursor ions. As a result, the carbon atom-oxygen atom double bond constituting the aldehyde group is changed to a single bond, a hydrogen atom is bonded to the carbon atom side, and an amino group is bonded to the oxygen atom side, whereby generating a product ion (adduct ion). The product ions generated in the collision cell 132 are focused in the vicinity of the ion optical axis C by the ion guide 134, and then enter the analysis chamber 14.

In the analysis chamber 14, as in the MS measurement, the product ions fly along the predetermined flight path defined by the reflectron electrode 144 and the flight tube 146 for a time corresponding to the mass-to-charge ratio of each ion, and are incident on the ion detector 145. The ion detector 145 outputs a signal having a magnitude corresponding to the incident amount of the ion every time the ion is incident. The output signals from the ion detector 145 are sequentially stored in the storage part 61. The storage part 61 stores measurement data with the time of flight of the ion and the detection intensity of the ion as axes.

When the measurement is completed, the aldehyde group estimation part 63 reads the measurement data and the information for converting the time of flight of the ion into the mass-to-charge ratio of the ion stored in the storage part 61, and converts the read data into mass spectrum (product ion spectrum) data with the mass-to-charge ratio of the ion and the detection intensity of the ion as axes.

When the mass spectrum data is created, the aldehyde group estimation part 63 extracts information of a mass peak included in the mass spectrum. Subsequently, among mass peaks having a mass-to-charge ratio larger than the mass-to-charge ratio of the precursor ions, a mass peak having a difference from the mass of the precursor ions of n times (n is a natural number) 17 Da (in the case of a monovalent ion, the mass-to-charge ratio is 17) (mass peak of adduct ion) is extracted. Then, the above-described n of the product ion having the largest mass-to-charge ratio is determined. After n is determined, the aldehyde group estimation part 63 displays, on the screen of the display part 8, mass peaks of precursor ions and mass peaks of adduct ions in the product ion spectrum with predetermined marks and the numerical value of n. Whereas, when there is no mass peak having the difference in the mass of the precursor ions being n times (n is a natural number) 17 Da (in the case of a monovalent ion, the mass-to-charge ratio is 17), among mass peaks having a mass-to-charge ratio larger than the mass-to-charge ratio of the precursor ions, it is estimated that no aldehyde group is included in the molecular structure of the sample component.

Figure 4:
FIG. 4 illustrates a molecular structure of Aldehyde C-10 and the molecular structure of the adduct ion generated by the reaction with an ammonia radical.
Figure 4:
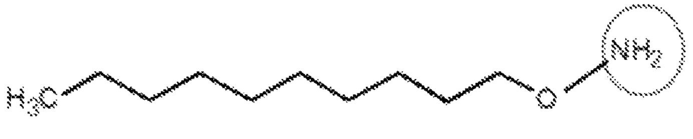

Herein, a result of measuring Aldehyde C-10 by the above procedure will be described. The upper part of FIG. 4 illustrates a molecular structure of precursor ions generated from Aldehyde C-10, and the lower part illustrates a molecular structure of product ions (adduct ions) generated by attachment of ammonia radicals. In addition, FIG. 5 is a product ion spectrum obtained by the measurement.

Figure 5:
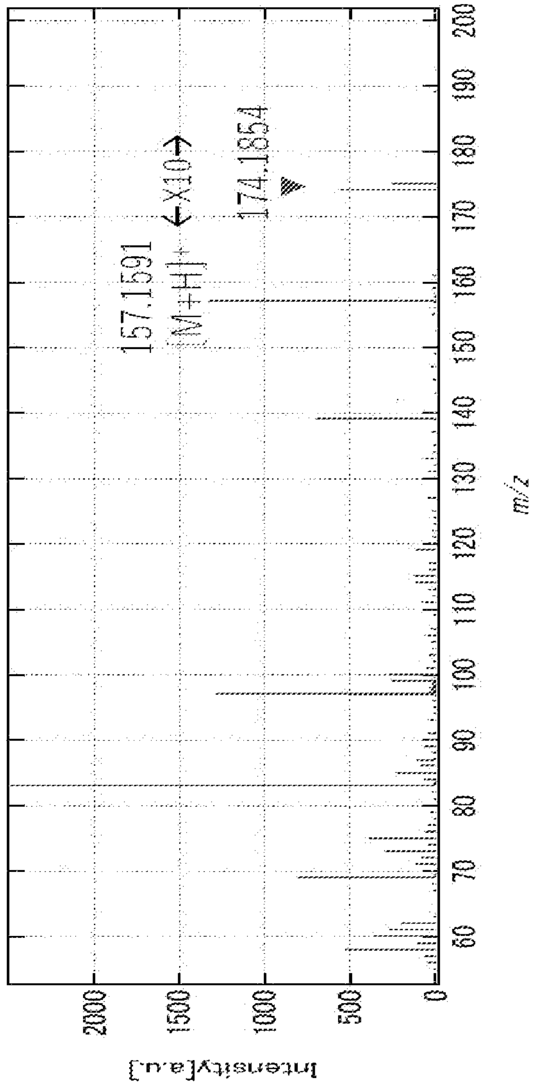
FIG. 5 illustrates a product ion spectrum of Aldehyde C-10 acquired using the mass spectrometer of the present embodiment.

In the product ion spectrum illustrated in FIG. 5, a mass peak with a mass-to-charge ratio of 151.1591 is derived from precursor ions (protonated ions). In addition, a mass peak appears at a position where the mass-to-charge ratio is 17.0263 larger than that of the precursor ion. This is a mass peak of adduct ions generated by reacting ammonia radicals with the precursor ions. Therefore, from this product ion spectrum, it is estimated that one aldehyde group is included in the molecular structure of the sample component (Aldehyde C-10).

Conventionally, for analyzing the molecular structure of precursor ions, there has been adopted a method in which precursor ions are subjected to collision induced dissociation (CID) to generate product ions, the obtained product ion spectrum is collated with a product ion spectrum stored in a database, and sample components are identified based on the degree of coincidence. However, in the CID method, selectivity of a position where precursor ions are dissociated is low, and even if mass spectrometry is performed under the same measurement conditions as those stored in the database, it is difficult to obtain the same product ion spectrum. Therefore, for example, when spectrum matching is performed to identify a compound, there are many candidate compounds having the same score (matching degree of mass spectrum), and it is difficult to identify which of them is a sample component.

In contrast, when the above measurement using the mass spectrometer of the present embodiment is performed, the number of aldehyde groups included in the compound that is the sample component is specified, and the candidate compound is narrowed down, so that the sample component can be more accurately identified. In addition, when precursor ions are reacted with ammonia radicals or ammonia molecules, selectivity of dissociation positions of the precursor ions is high, and a mass spectrum close to the mass spectrum stored in the database is easily obtained as compared with the CID method, so that identification accuracy of compounds by spectrum matching is increased.

The above-described embodiment is merely an example, and can be modified as appropriate in accordance with the spirit of the present invention. In the above embodiment, only the measurement of obtaining the product ion spectrum by attaching ammonia radicals, which is characteristic of the present invention, has been described. However, it is preferable that the product ion spectrum is also obtained by the CID method in addition to this measurement, and the sample components are identified from both the product ion spectra.

In the above embodiment, the time-of-flight (TOF) type mass separation part is used as a mass filter in the subsequent stage, but other types of mass separation parts such as a quadrupole mass filter can also be used. However, the precise mass of the product ions can be measured by using the TOF type mass separation part as in the above embodiment, and thus it is possible to more reliably specify the adduct ions generated by attachment of ammonia radicals.

In addition, in the above embodiment, the sample component in the liquid sample is ionized by the electrospray ionization probe 101, but another ionization source such as an atmospheric pressure chemical ionization (APCI) probe may be used. In addition, not only the liquid sample but also a solid sample and a gas sample can have a configuration in which sample components are ionized by an appropriate ionization source.

Further, in the above embodiment, the precursor ions are introduced into the collision cell 132 to attach ammonia radicals, but the precursor ions can be introduced into an ion trap.

[Modes]

It is understood by those skilled in the art that the plurality of exemplary embodiments described above are specific examples of the following modes.

(Clause 1)

A mass spectrometry method according to a mode includes:

- reacting a precursor ion with ammonia molecules or ammonia radicals to generate product ions;
- separating the product ions according to a mass-to-charge ratio and detecting the product ions; and
- estimating whether or not an aldehyde group is included in a molecular structure of the precursor ion based on the difference between a mass-to-charge ratio of one of the detected product ions and a mass-to-charge ratio of the precursor ion.

(Clause 2)

A mass spectrometer according to a mode is an apparatus for generating product ions from a precursor ion and performing mass spectrometry, the mass spectrometer including:

- a reaction chamber to which the precursor ion is introduced;
- an ammonia supply part configured to supply ammonia molecules or ammonia radicals to the reaction chamber; and
- a separation and detection part configured to separate product ions generated from the precursor ion by reaction with the ammonia molecules or ammonia radicals according to a mass-to-charge ratio, and to detect the product ions.

In the mass spectrometry method of clause 1 and the mass spectrometer of clause 2, a precursor ion derived from a sample component is reacted with ammonia molecules ($NH_3$) or ammonia radicals (NH radicals or $NH_2$ radicals) to generate product ions, and the generated product ions are separated according to a mass-to-charge ratio, and detected. Then, whether or not an aldehyde group is included in the molecular structure of the precursor ions is estimated based on the difference between the mass-to-charge ratio of one of the product ions and the mass-to-charge ratio of the precursor ion. The mass spectrometry method described in clause 1 and the mass spectrometer described in clause 2 are based on the finding that when a precursor ion having the aldehyde group is reacted with an ammonia molecule or an ammonia radical, they selectively act on the aldehyde group to change a double bond of a carbon atom-oxygen atom to a single bond, and an adduct ion in which hydrogen atom is bonded to a carbon atom side and an amino group is bonded to an oxygen atom side is generated. The precursor ion having an aldehyde group is reacted with an ammonia molecule or an ammonia radical, whereby generating a product ion (an adduction) with an increased mass by 17 Da per one aldehyde group as a product ion. Therefore, whether or not an aldehyde group is included in the molecular structure of the precursor ion can be estimated based on the difference between the mass-to-charge ratio of one of the product ions generated from the precursor ion and the mass-to-charge ratio of the precursor ion.

(Clause 3)

The mass spectrometer according to clause 2 further includes

- an aldehyde group estimation part configured to estimate whether or not an aldehyde group is included in a molecular structure of the precursor ion based on a difference between a mass-to-charge ratio of the detected product ion and a mass-to-charge ratio of the precursor ion.

In the mass spectrometer described in clause 3, the presence or absence of an aldehyde group is estimated by the aldehyde group estimation part, and thus it is not necessary for the user to analyze the difference between the mass-to-charge ratio of the product ion and the mass-to-charge ratio of precursor ion by himself/herself, and it is possible to easily obtain information on the presence or absence of an aldehyde group.

(Clause 4)

In the mass spectrometer according to clause 3,

- the aldehyde group estimation part is configured to estimate that one aldehyde group is included per 17 Da for a difference in the mass-to-charge ratio.

In the mass spectrometer described in clause 4, not only the presence or absence of aldehyde groups but also information on the number of aldehyde groups can be obtained.

(Clause 5)

In the mass spectrometer according to any one of clauses 2 to 4,

- the ammonia supply part includes a radical generation part configured to generate ammonia radicals.

In the mass spectrometer according to clause 5, ammonia radicals are generated by the radical generation part and reacted with a precursor ion. Radical species are more chemically active than neutral molecules, and thus they can react with more precursor ions to produce adduct ions than they react with ammonia molecules.

(Clause 6)

In the mass spectrometer according to any one of clause 5,

- the radical generation part is configured to generate nitrogen radicals and hydrogen radicals or hydrogen atoms.

(Clause 7)

In the mass spectrometer according to clause 5 or 6,

- the radical generation part is configured to generate radicals using nitrogen gas and water vapor as material gases.

In the mass spectrometer described in clause 6, ammonia radicals are generated from nitrogen radicals and hydrogen radicals or hydrogen atoms. These radicals or atoms can be generated from various material gases, and thus the material gas can be selected in consideration of conditions such as easy handling and availability of gas and cost. As a combination of material gases in consideration of these points, for example, a mixed gas of nitrogen gas and water vapor can be used as the material gas as in the mass spectrometer described in clause 7.

REFERENCE SIGNS LIST

1 . . . Mass Spectrometer
10 . . . Ionization Chamber
101 . . . Electrospray Ionization Probe
11 . . . First Intermediate Vacuum Chamber
111 . . . Ion Lens
12 . . . Second Intermediate Vacuum Chamber
121 . . . Ion Guide
13 . . . Third Intermediate Vacuum Chamber
131 . . . Quadrupole Mass Filter
132 . . . Collision Cell
133 . . . Multipole Ion Guide
134 . . . Ion Guide
14 . . . Analysis Chamber
141 . . . Ion Transport Electrode
142 . . . Orthogonal Acceleration Electrode
143 . . . Acceleration Electrode
144 . . . Reflectron Electrode
145 . . . Ion Detector
146 . . . Flight Tube
4 . . . Collision Gas Supply Part
5 . . . Radical Supply Part
51 . . . Radical Generation Chamber
52 . . . Material Gas Supply Source
53 . . . Radio-Frequency Power Supply Part
54 . . . Radical Source
58 . . . Transport Pipe
581 . . . Head Part
6 . . . Control/Processing Part
61 . . . Storage Part
62 . . . Measurement Control Part
63 . . . Aldehyde Group Estimation Part
7 . . . Input Part
8 . . . Display Part

The invention claimed is:

1. A mass spectrometry method comprising:
reacting a precursor ion with ammonia molecules or ammonia radicals to generate product ions;
separating the product ions according to a mass-to-charge ratio and detecting the product ions; and
estimating whether or not an aldehyde group is included in a molecular structure of the precursor ion based on a difference between a mass-to-charge ratio of one of the detected product ions and a mass-to-charge ratio of the precursor ion.

2. A mass spectrometer, being an apparatus for generating product ions from a precursor ion and performing mass spectrometry, the mass spectrometer comprising:
a reaction chamber to which the precursor ion is introduced;
an ammonia supply part configured to supply ammonia molecules or ammonia radicals to the reaction chamber;
a separation and detection part configured to separate product ions generated from the precursor ion by reaction with the ammonia molecules or ammonia radicals according to a mass-to-charge ratio and to detect the product ions; and
an aldehyde group estimation part configured to estimate whether or not an aldehyde group is included in a molecular structure of the precursor ion based on a difference between a mass-to-charge ratio of the detected product ion and a mass-to-charge ratio of the precursor ion.

3. The mass spectrometer according to claim 2, wherein the aldehyde group estimation part is configured to estimate that one aldehyde group is included per 17 Da for a difference in the mass-to-charge ratio.

4. The mass spectrometer according to claim 2, wherein the ammonia supply part includes a radical generation part configured to generate ammonia radicals.

5. The mass spectrometer according to claim 4, wherein the radical generation part is configured to generate nitrogen radicals and hydrogen radicals or hydrogen atoms.

6. The mass spectrometer according to claim 4, wherein the radical generation part is configured to generate radicals using nitrogen gas and water vapor as material gases.

* * * * *